United States Patent [19]

Popovics

[11] 4,419,138

[45] Dec. 6, 1983

[54] ACCELERATOR ADDITIVE FOR CEMENTITIOUS COMPOSITIONS

[76] Inventor: Sandor Popovics, 283 Congress Ave., Lansdowne, Pa. 19050

[21] Appl. No.: 303,482

[22] Filed: Sep. 18, 1981

[51] Int. Cl.$^3$ .............................................. C04B 7/35
[52] U.S. Cl. ........................... 106/90; 106/315; 106/DIG. 1
[58] Field of Search ............... 106/90, 314, 315, 97, 106/89, 98, DIG. 1

[56] References Cited

U.S. PATENT DOCUMENTS

| | | |
|---|---|---|
| 188,679 | 3/1877 | Schaffer . |
| 223,735 | 1/1880 | Hoopes . |
| 233,960 | 11/1880 | Young . |
| 300,560 | 6/1884 | Bening . |
| 446,285 | 2/1891 | Fottrell . |
| 611,621 | 10/1898 | Frenchel . |
| 645,392 | 3/1900 | Heinl et al. . |
| 657,001 | 8/1900 | O'Brien . |
| 716,491 | 12/1902 | Spence . |
| 812,978 | 2/1906 | Chase . |
| 1,608,562 | 11/1926 | Melandri . |
| 2,169,980 | 8/1939 | Scripture ............................ 106/27 |
| 2,188,767 | 1/1940 | Cannon et al. ........................ 166/21 |
| 2,228,539 | 1/1941 | Stark .................................. 106/314 |
| 2,374,581 | 4/1945 | Brown ................................. 106/89 |
| 2,601,274 | 6/1952 | Glantz et al. ......................... 106/90 |
| 2,857,286 | 10/1958 | Striker ............................... 106/90 |
| 2,880,102 | 3/1959 | Woodard et al. ..................... 106/90 |
| 3,144,347 | 8/1964 | Cowan ................................ 106/90 |
| 3,210,207 | 10/1965 | Dodson et al. ...................... 106/90 |
| 3,619,221 | 11/1971 | Kossivas ............................. 106/90 |
| 3,801,338 | 4/1974 | Whitaker ............................. 106/90 |
| 4,261,755 | 4/1981 | Berry et al. ......................... 106/90 |
| 4,264,367 | 4/1981 | Schutz ............................... 106/90 |
| 4,264,368 | 4/1981 | Schutz ............................... 106/90 |

*Primary Examiner*—James Poer
*Attorney, Agent, or Firm*—Woodcock, Washburn, Kurtz, Mackiewicz & Norris

[57] ABSTRACT

Cementitious compositions exhibiting accelerated hardening including improved strength development are formed by the addition of from about 0.5% to about 10% formic acid based on the weight of the cement. Compositions exhibiting accelerated setting as well as accelerated hardening may also be formed. The resulting strengths are superior to those exhibited by compositions using formate salts.

15 Claims, 2 Drawing Figures

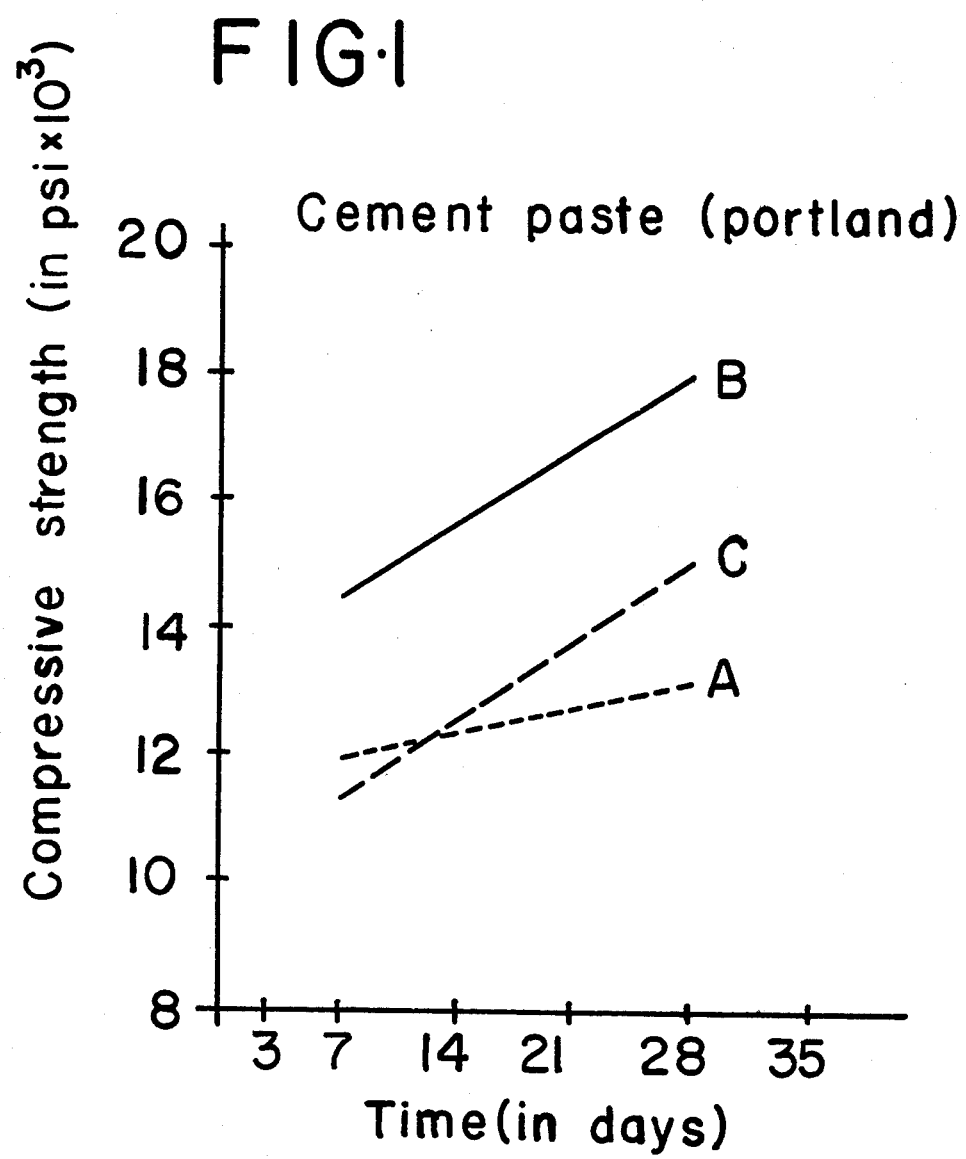

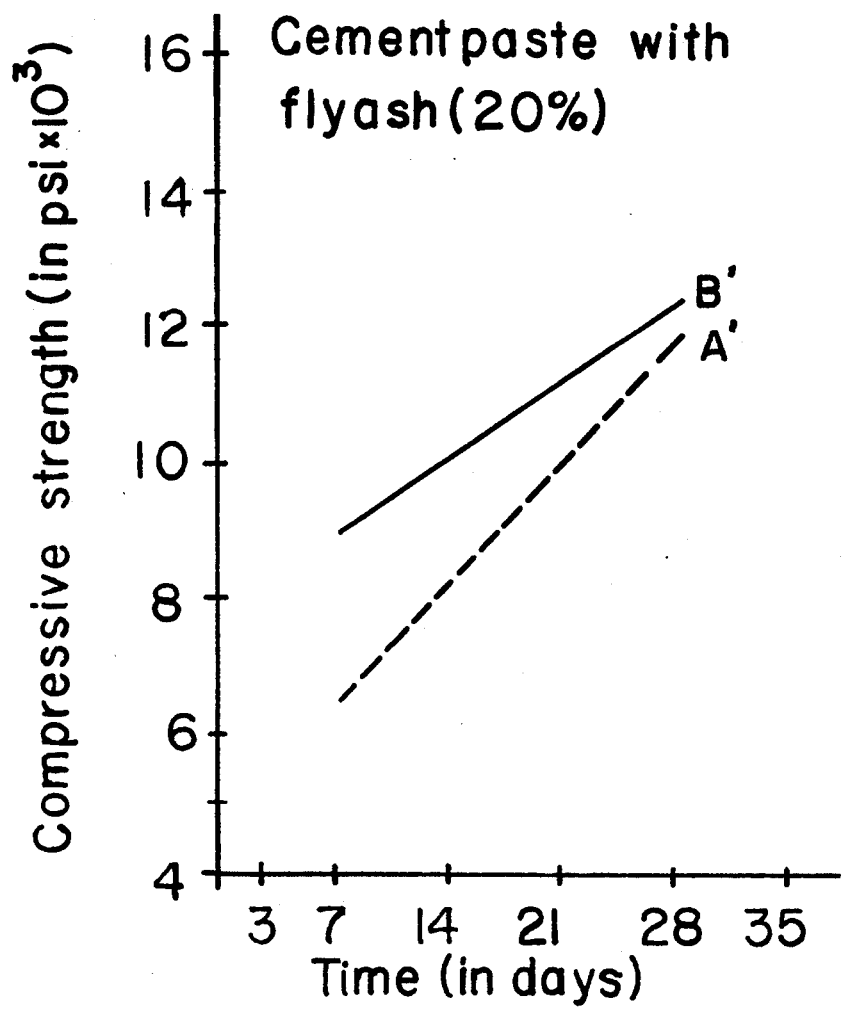

ACCELERATOR ADDITIVE FOR CEMENTITIOUS COMPOSITIONS

BACKGROUND OF THE INVENTION

1. Field of the Invention

The present invention relates to formic acid as a substantially chloride free accelerator additive for forming cementitious compositions which exhibit accelerated hardening, including superior compressive strengths, and to methods for forming such compositions. Optionally, compositions exhibiting accelerated setting as well as accelerated hardening may also be formed. The compositions and methods of this invention may be used with a wide variety of cementitious compositions including hydraulic cements such as portland cement, non-hydraulic cements such as epoxy cements, finely divided mineral admixtures such as fly ash, or any combination of these.

2. Background and Objects of the Invention

Cement compositions or cementitious materials are usually classified as hydraulic cements or non-hydraulic cements. Hydraulic cements usually require the presence of water to harden. The most significant class of hydraulic cements is portland cement. Non-hydraulic cements can harden without water, and their most important class is polymer cements. Another important class of cementitious materials is finely divided mineral admixtures, including latent hydraulic binders, or pozzolanic materials. These require the addition of a triggering material such as lime in order to form a cement. Cementitious materials may also comprise a mixed binder system, for example, a blend of a polymer and portland cement, also called polymer-modified portland cement. Concrete is formed by mixing a cement with aggregate(s), water (if required) (also called mixing water), and optionally, additive(s) also known as admixture(s). An admixture is a material other than water, aggregate(s) or cement which is used as an ingredient of concrete; it is usually added to a batch of cement or concrete immediately before or during its mixing. Admixtures may be used to alter one or more properties of concrete including acceleration, and/or improvement of strength development, water reduction and set control, air-entrainment, gas formation, color, flocculation, and reduction of alkali aggregate expansion. As an overview of the various aspects of concrete, especially hydraulic cements, see *Concrete Making Materials*, by S. Popovics, incorporated by reference herein. Particular reference is directed to Ch. 2 for the various types of portland cements and their properties including hardening and setting, Ch. 4 for hydraulic cements other than portland, and Ch. 6 for additives or admixtures for concretes. (See p. 134 for a listing of fifteen groups of admixtures suggested as a classification system by the American Concrete Institute.) Since many admixtures affect more than one property of concrete, sometimes adversely, the optimum use of admixtures may require careful attention to the type and amount of admixture(s) as well as the type and amount of cement or concrete used.

Control of hardening and setting is important to the construction industry. For example, accelerating the hardening of a concrete foundation may allow faster completion of a building. Those admixtures commonly called accelerators are added to increase the rate of hardening, the rate of setting or both. The most common accelerator for concrete is calcium chloride ($CaCl_2$) either by itself or as a principal admixture ingredient. Other materials and/or mixtures have also been disclosed as accelerators.

For example, U.S. Pat. Nos. 4,264,367 and 4,264,368 to Schutz disclose a method and compositions for accelerating the setting time of portland cement using water-soluble carbonates and alpha-hydroxy carbonyl compounds.

U.S. Pat. No. 4,261,755 to Berry et al teaches the use of sodium, calcium and ammonium salts of formic acid as early strength developers and setting accelerators in hydraulic cements, concretes, mortars and plasters.

U.S. Pat. No. 3,619,211 to Kossivas discloses the use of water-soluble formate salts formed by mixing an amine with formic acid as set-accelerating additives for portland cement compositions.

U.S. Pat. No. 3,801,338 to Whitaker discloses an additive for hydraulic cement which comprises a major amount of sodium nitrite together with a minor amount of calcium formate.

U.S. Pat. No. 3,210,207 to Dodson et al teaches the use of calcium formate mixed with a member selected from the group consisting of benzoic acid and the alkali metal, alkaline earth metal, and ammonium salts of chromic, benzoic, and nitrous acid.

U.S. Pat. No. 2,880,102 to Woodard et al teaches the use of cementing compositions comprising at least one salt of the group consisting of the sodium, lithium, potassium, and ammonium salts of formic, acetic, nitrous, chloroacetic, gluconic, and tartaric acids.

While admixtures used as accelerators may increase the rate of setting or early hardening of cementitious materials they frequently do so at the expense of later strengths. Additionally, the use of admixture(s) containing chloride ion may cause corrosion problems with metallic reinforcement (usually made from steel) embedded in the concrete.

It is, therefore, an object of the present invention to provide a substantially chloride-free accelerator for use in forming cementitious compositions which exhibit improved strengths and, optionally, faster setting.

It is another object of the present invention to provide cementitious compositions and methods for their formation in which the compositions exhibit accelerated hardening, and, optionally, accelerated setting without reduction of final strength.

It is a further object to provide cementitious compositions which comprise a substantially chloride-free accelerator.

It is another object of this invention to provide finely divided mineral admixtures pretreated with formic acid wherein such material may be used to form cements exhibiting accelerated hardening including improved strength and, optionally, exhibiting accelerated setting.

It is yet a further object of this invention to provide non-hydraulic cementitious compositions including latex, acrylic, epoxy and other polymer cements, which exhibit accelerated hardening and, optionally, accelerated setting.

It is still a further object of this invention to provide cementitious compositions comprising mixed binders which exhibit accelerated hardening and, optionally, accelerated setting.

These and other objects of the invention will be apparent from the following description.

BRIEF DESCRIPTION OF THE DRAWING

FIGS. 1 and 2 are graphs of data for compressive strengths illustrating the beneficial effects of a formic acid additive as reflected in the improved strength properties of cementitious compositions made according to this invention.

SUMMARY OF THE INVENTION

The compositions of the present invention are formed by the addition of formic acid to a cementitious composition in an amount of from about 0.5% to about 10% by weight based on the weight of the cement, including the weight of any finely divided mineral admixture. The addition may be accomplished by adding the formic acid to a wet mixture of the cementitious composition, to a component of the wet mixture, or by pretreating a finely divided mineral admixture or an aggregate. Such addition of formic acid results in the acceleration of the hardening of the cementitious compositions upon activation, i.e., the formation of a cement paste, mortar or concrete. The compositions of this invention may also be formed, optionally, to exhibit accelerated setting upon activation. The compositions of this invention may also be used in conjunction with other admixture(s), e.g., set retarding agents, water-reducing admixtures, air-entraining admixtures, polymers, and/or finely divided mineral admixtures such as fly ash.

DETAILED DESCRIPTION OF THE INVENTION

It has been found that cementitious compositions having an accelerated hardening including increased strength, and optionally, having accelerated setting, may be formed by the addition of formic acid in an amount of from about 0.5% to about 10% by weight (based on the weight of the cement material including the weight of any finely divided mineral admixture) to a cement material, cement paste, concrete or mortar. Surprisingly, the increased strength is superior to that achieved by the addition of salt(s) of formic acid. As used herein, cementitious composition, cement composition, cement material, or cementitious material includes hydraulic cements, non-hydraulic cements, polymer cements, polymer-modified cements, latent hydraulic cementitious material (e.g., fly ash), and any mixtures of these materials. The term cement paste will be used for a mixture comprising cement and water. The term mortar will be used for a composition comprising cement paste and fine aggregate. The term concrete will be used for a composition comprising cement paste, fine and/or coarse aggregates. All of these compositions may be made with any kind of admixture(s), epoxies, latexes, other polymers, pre-polymers, or other modifying chemicals.

The compositions of this invention are formed by adding from about 0.5% to about 10% by weight of formic acid to a cement material. Preferred ranges for addition (especially when used with a portland cement) for accelerated hardening are from about 1.0% to about 6.0% by weight, with from about 1.5% to about 4.0% being the most preferred. If a cementitious composition exhibiting accelerated setting upon activation is desired, the preferred level of addition is from about 1.5% to about 8%, and a more preferred range of from about 2% to about 6%. Additionally, other admixtures, including any of those currently used in the art, may be used to vary the characteristics of the cementitious materials or concrete. In a particularly preferred embodiment, a sugar such as a sucrose is added to retard setting time, and/or a water-reducing admixture is also used.

The formic acid preferred for use is of about 88% to about 90% purity (Certified grade, from Fisher Scientific Co.). The formic acid may be used in this concentrated form or may be added as a solution to the cement or concrete material.

The method of this invention may be practiced in several ways. In the case of hydraulic cement the formic acid solution may be added to the cementitious material, cement paste, concrete or mortar in one step at the beginning of the wet mixing, added in several steps at the beginning and during the mixing, or added in one or more steps after the cement or concrete has been pre-mixed with the mixing water or with a portion of the mixing water. If the formic acid is used in the form of a solution, such solution may be formed by mixing a preselected amount of formic acid with the mixing water or a portion thereof. The mixing water now containing the acid is then used as usual.

In the case of non-hydraulic cements such as polymer cements, the formic acid may be mixed directly with the cement portion or cement/polymer mixture before it is placed into a construction site structure. Alternatively, the formic acid may be mixed with one of the components of the polymer system; for example, in an epoxy system where the polymeric portion is composed of part A and part B, the formic acid may be added to either A or B individually before the mixing of both A and B is performed.

For mortar and concrete, an alternative method of addition also includes exposing the aggregate material to formic acid or a solution thereof.

Finely divided mineral admixtures may either be used by themselves with a triggering agent, or in conjunction with other hydraulic or non-hydraulic cements. The use of formic acid with finely divided mineral admixtures may be accomplished as previously explained for hydraulic or non-hydraulic materials. Alternatively, finely divided mineral admixtures may be pretreated with formic acid or a formic acid solution, dried, e.g., by evaporation, and stored until used.

The level of addition of formic acid should be from about 0.5% to about 10% by weight of cement material. The preferred levels of addition for formic acid may vary depending on the type of cementitious composition with which it is used and on the purpose of the addition. For accelerating the hardening of portland cement and epoxy-modified cement the preferred range is from about 1.0% to about 6.0%, and the most preferred level is from about 1.5% to about 4.0%. If the formic acid is added to a finely divided mineral admixture as a pretreatment, the level of addition should be increased so that the final level of addition is from about 0.5% to about 10% based on the weight of the total amount of cement material contained therein. For cement/polymer systems containing no substantial amounts of additional mixing water, it is preferred to consider the amount of polymeric component(s) and slightly higher levels of addition may be preferred.

The compositions of this invention may also be used with polymeric cements or polymer modified cements. When forming cement compositions containing these materials it is desirable to add a dispersing agent or to use a polymeric material which already contains such an agent. The addition of defoaming agents may also be desirable.

As noted above the cementitious compositions formed by the addition of formic acid exhibit compressive strengths superior to compositions to which no admixtures were added or to those using a formate salt. These results may, in part, be seen by referring to FIGS. 1 and 2.

FIGS. 1 and 2 show the effect of adding formic acid to a portland cement paste and a cement paste made with 20% fly ash. In FIG. 1, line A represents the data from control specimens in which no formic acid was used, line B represents the data from specimens in which about 2% formic acid was used, and line C represents the average data for five sets of specimens in which each set of specimens comprised a preselected concentration of sodium formate and the overall range of concentrations for the sets was from about 0.25% to about 3.0% by weight. The superior strengths of the specimens comprising formic acid can be seen at 7 and 28 days.

In FIG. 2, line A' represents data from the control specimens in which no formic acid was used and line B' represents data from specimens comprising about 2% formic acid.

Strengths were obtained on two-inch cube specimens made of mixtures of cement and water. The water:cement ratio was about 27:100. All the specimens were cured at room temperature. The measurement of ultimate load and the calculation of compressive strength were done according to ASTM C 109, paragraph 8.6. Measurements were taken at 7 days and 28 days.

The following examples are illustrative of the invention but should not be construed as limitations thereon.

EXAMPLE 1

A cementitious material was made from 928 g. of cement (type I, portland), 232 g. of natural pozzolanic material, 3198 g. of sand (Ottawa, C 109), 625 g. of water, and about 3% formic acid (Certified grade, Fisher Scientific Co.) based on the weight of the cement. Control A and Control B contained the same amounts of cement, natural pozzolanic material, sand and water as Example 1, but no formic acid. Control B additionally contained about 5% by weight (based on the cement and pozzolanic material) of calcium formate. Two-inch cubes were used as strength specimens, and compared to strength specimens for the controls containing no admixtures or 5% calcium formate. Measurement of the ultimate load and calculation of compressive strength were done according to ASTM C 109, paragraph 8.6. Average compressive strength measurements in pounds per square inch (psi) are listed in Table 1.

TABLE 1

| Example Number | Admixture | Average Compressive Strengths (psi) | | | |
|---|---|---|---|---|---|
| | | Cured for 7 days in | | Cured for 28 days in | |
| | | water | steam | water | steam |
| Control A | None | 2540 | 3760 | 3430 | 4090 |
| Control B | Calcium formate (5% of cement weight) | 2405 | 3242 | — | — |
| Example 1 | Formic Acid (3% of cement weight) | 4696 | 4950 | 5348 | 5717 |

EXAMPLES 2–4

Cementitious compositions were formed by mixing 275 g. of cement (portland, type I), 756.3 g. of sand, and 120 g. of water with varying amounts of sugar (as a set-retarding admixture) and formic acid as listed in Table 2. Example 2 comprised about 5.5 ml. (about 2%) formic acid. Example 3 comprised about 8.25 ml. (about 3%) formic acid. Example 4 comprised about 9.9 ml. (about 3.6%) formic acid. No formic acid was added to Control C. Compressive strengths were measured after 7 days and 28 days and recorded in Table 2.

TABLE 2

| Example No. | Admixture | | Compressive Strength (psi) | |
|---|---|---|---|---|
| | Formic Acid (ml.) | Sugar (grams) | 7 days | 28 days |
| 2 | 5.5 | 2 | 7250 | 12,480 |
| 3 | 8.25 | 2 | 8675 | 11,210 |
| 4 | 9.9 | 0 | 8890 | 11,660 |
| Control C | 0 | 0 | 6950 | 9,100 |

EXAMPLES 5–9

(Examples With Varying Amounts of a Set-Retarding Admixture)

Cementitious compositions were formed by mixing 1000 g. of cement (portland, type I) with 275 g. of water, formic acid, and sugar (as a set-retarding admixture) as listed in Table 3. Except for the controls which contained no formic acid, the amount of formic acid added was kept constant while the amount of sugar added was varied. Control D had no sugar added to it. Control E had 2 grams of sugar added to it. Compressive strengths were measured at 7 days and 28 days and recorded in Table 3.

TABLE 3

| Example No. | Admixture | | Compressive Strength (psi) | |
|---|---|---|---|---|
| | Formic Acid (ml) | Sugar (grams) | 7 days | 28 days |
| 5 | 20 | 0 | 14,250 | 17,210 |
| 6 | 20 | 1 | 15,650 | 17,850 |
| 7 | 20 | 2 | 14,550 | 18,060 |
| 8 | 20 | 3 | 12,900 | 19,960 |
| 9 | 20 | 5 | 12,550 | 15,680 |
| Control D | 0 | 0 | 12,500 | 14,750 |
| Control E | 0 | 2 | 12,100 | 15,610 |

EXAMPLE 10

(Epoxy Modified Cement Paste)

Two-inch cubes were made from a cement paste comprising 1000 g. of cement (portland, type I), 200 g. of a two-part epoxy (Epi-Top PC-10, from Celanese*), 125 g. of water, and 20 ml. of formic acid. Control F had no formic acid admixture added. Compressive strength was measured and compared to a control containing no formic acid as listed in Table 4.

*Epi-Top is a two-component system: "A" is a condensation product of a polyhydroxy compound with epichlorohydrin; "B" is a reactive amido-amine type curing agent. Additionally, Epi-Top contains an integral nonionic dispersing agent.

TABLE 4

| Example No. | Admixture | Compressive Strength (psi) | |
|---|---|---|---|
| | | 7 days | 28 days |
| 10 | Formic acid (20 ml) | 10,500* | 12,525** |
| | | | 10,680* |

TABLE 4-continued

| Example No. | Admixture | Compressive Strength (psi) 7 days | 28 days |
|---|---|---|---|
| Control F | None | 7,025* | 9,225** |
|  |  |  | 7,250* |

*Stored under water until breaking.
**Stored under water for 7 days, then stored in lab air until breaking.

I claim:

1. A method for accelerating the hardening of a quantity of a settable cementitious material comprising:
selecting a quantity of cementitious material; and
mixing from about 0.5% to about 10% by weight formic acid with said cementitious material.

2. The method of claim 1 comprising the further steps of:
initiating the setting of said mixture; and
allowing said mixture to harden.

3. The method of claim 1 or 2 wherein said mixing is with from about 1.5% to about 4.0% by weight formic acid.

4. The method of claim 1 wherein said method also comprises inducing accelerated setting.

5. The method of claim 4 wherein said mixing is with from about 1.5% to about 8% by weight formic acid.

6. A method for accelerating the hardening of a quantity of a settable cementitious material comprising:
selecting a quantity of cementitious material comprising a quantity of a finely divided mineral admixture; and
pretreating said quantity of said finely divided mineral admixture, said pretreating comprising the steps of contacting said finely divided mineral admixture with a solution comprising formic acid having a preselected concentration, and evaporating off said formic acid solution.

7. The method of claim 6 comprising the further steps of:
mixing said cementitious material comprising said finely divided mineral admixture;
initiating the setting of said mixture; and
allowing said mixture to harden.

8. The method of claim 7 wherein said setting is accelerated.

9. A method for accelerating the hardening of a quantity of a settable cementitious material comprising:
selecting a quantity of a cementitious material comprising a quantity of mineral aggregate;
pretreating said quantity of mineral aggregate with a solution comprising formic acid, said pretreating comprising the steps of contacting said mineral aggregate with a solution comprising formic acid having a preselected concentration, and evaporating off said formic acid solution.

10. The method of claim 9 comprising the further steps of:
mixing said cementitious material comprising said mineral aggregate;
initiating the setting of said mixture; and
allowing said mixture to harden.

11. The method of claim 9 wherein said setting is accelerated.

12. The method of claim 9 which comprises the additional step of adding at least one other admixture to said cementitious composition.

13. A finely divided mineral admixture pretreated with formic acid and adapted for forming a cementitious composition exhibiting accelerated hardening wherein the level of addition of said formic acid is from about 0.5% to about 10% based on the total amount of cement material.

14. The pretreated finely divided mineral admixture of claim 13 adapted for forming a cementitious composition exhibiting accelerated setting wherein the level of addition of said formic acid is from about 0.5% to about 10% based on the total amount of cement material.

15. The composition of claim 13 or 14 wherein said finely divided mineral admixture is fly ash.

* * * * *

UNITED STATES PATENT AND TRADEMARK OFFICE
CERTIFICATE OF CORRECTION

PATENT NO. : 4,419,138
DATED : December 6, 1983
INVENTOR(S) : Sandor Popovics

It is certified that error appears in the above–identified patent and that said Letters Patent are hereby corrected as shown below:

Column 2, line 13, "3,619,211" should read -- 3,619,221 --.

Signed and Sealed this

Twenty-eighth Day of February 1984

[SEAL]

Attest:

GERALD J. MOSSINGHOFF

Attesting Officer     Commissioner of Patents and Trademarks